United States Patent [19]
Kawaguchi et al.

[11] Patent Number: 4,747,722
[45] Date of Patent: May 31, 1988

[54] METAL-CERAMIC FITTING ASSEMBLY

[75] Inventors: Yasunobu Kawaguchi, Tokyo; Toshiaki Muto; Tatsuo Ichinokawa, both of Saitama, all of Japan

[73] Assignee: Honda Giken Kogyo Kabushiki Kaisha, Tokyo, Japan

[21] Appl. No.: 811,160

[22] Filed: Dec. 19, 1985

[30] Foreign Application Priority Data

Dec. 19, 1984 [JP] Japan ............................ 59-191479[U]
Dec. 22, 1984 [JP] Japan ............................ 59-194618[U]

[51] Int. Cl.$^4$ ............................ F16B 9/00; F01D 5/28
[52] U.S. Cl. ..................................... 403/30; 403/272; 403/273; 403/361; 403/404; 416/241 B; 416/244 A
[58] Field of Search ...................... 403/28, 29, 30, 179, 403/361, 404, 272, 268, 360, 314; 416/241 B, 213 R, 244 A

[56] References Cited

U.S. PATENT DOCUMENTS

| | | | |
|---|---|---|---|
| 2,015,484 | 9/1935 | Lilienfeld | 403/179 |
| 3,666,302 | 5/1972 | Kellett | 403/28 |
| 3,801,226 | 4/1974 | Bevan et al. | 416/241 B |
| 4,281,941 | 8/1981 | Rottenkolber | 403/29 |
| 4,325,647 | 4/1982 | Maier et al. | 403/29 |
| 4,335,998 | 1/1982 | Siebels | 416/213 R |
| 4,424,003 | 1/1984 | Brobeck | 416/241 B |
| 4,486,147 | 12/1984 | Byrne et al. | 403/268 X |
| 4,509,880 | 4/1985 | Wamstad | 403/179 |
| 4,585,396 | 4/1986 | Kawamura et al. | 416/241 B |
| 4,614,453 | 9/1986 | Tsuno et al. | 403/30 |
| 4,639,194 | 1/1987 | Bell, III et al. | 416/241 B |

FOREIGN PATENT DOCUMENTS

| | | | |
|---|---|---|---|
| 95540 | 12/1983 | European Pat. Off. | 416/241 B |
| 2734747 | 2/1979 | Fed. Rep. of Germany | 416/213 R |
| 125302 | 9/1980 | Japan | 416/241 B |
| 93606 | 6/1982 | Japan | 416/241 B |
| 196323 | 11/1983 | Japan | 403/28 |
| 5701 | 1/1984 | Japan . | |
| 103902 | 6/1984 | Japan . | |

OTHER PUBLICATIONS

Journal of Physics E: Scientific Instrument, vol. 4 (Jan. 1971), pp. 65–66.
Title: Ceramic-Metal Sealing with Solder Glass, by H. Kukral, N. Muller and W. Ottenberger, printed Great Britain.

Primary Examiner—Randolph A. Reese
Assistant Examiner—Peter M. Cuomo
Attorney, Agent, or Firm—Lyon & Lyon

[57] ABSTRACT

A metal-ceramic composite fitting assembly is described in which an effective connection between a boss on the ceramic member and the metal shaft member is achieved by providing the shaft with a sleeve formed of a material having a coefficient of thermal elongation comparable to that of the ceramic member, which sleeve is joined to the shaft member and cooperates with a recess therein to engage the boss along its length and to impose thereon compressive gripping forces that increase in magnitude along the length of the boss.

6 Claims, 5 Drawing Sheets

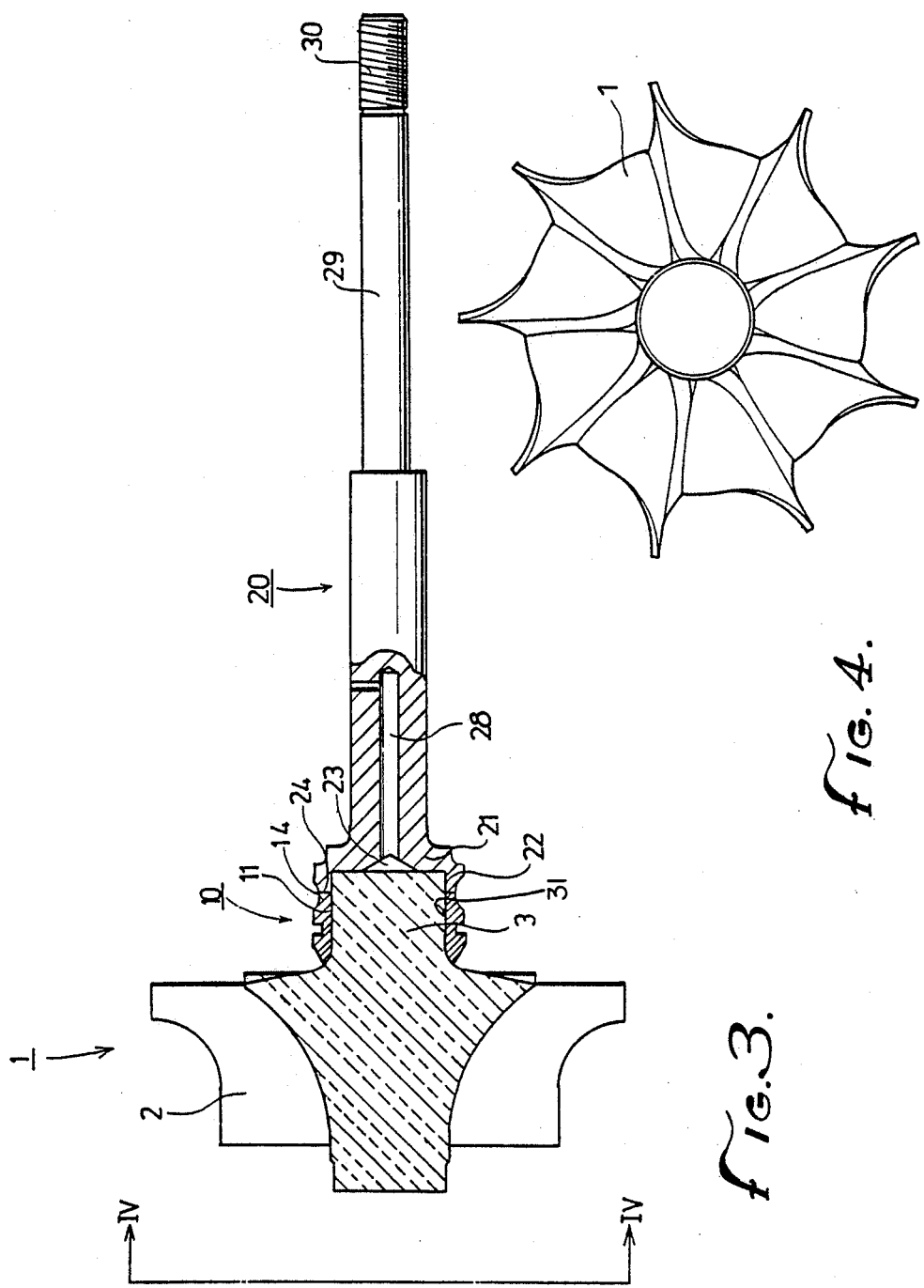

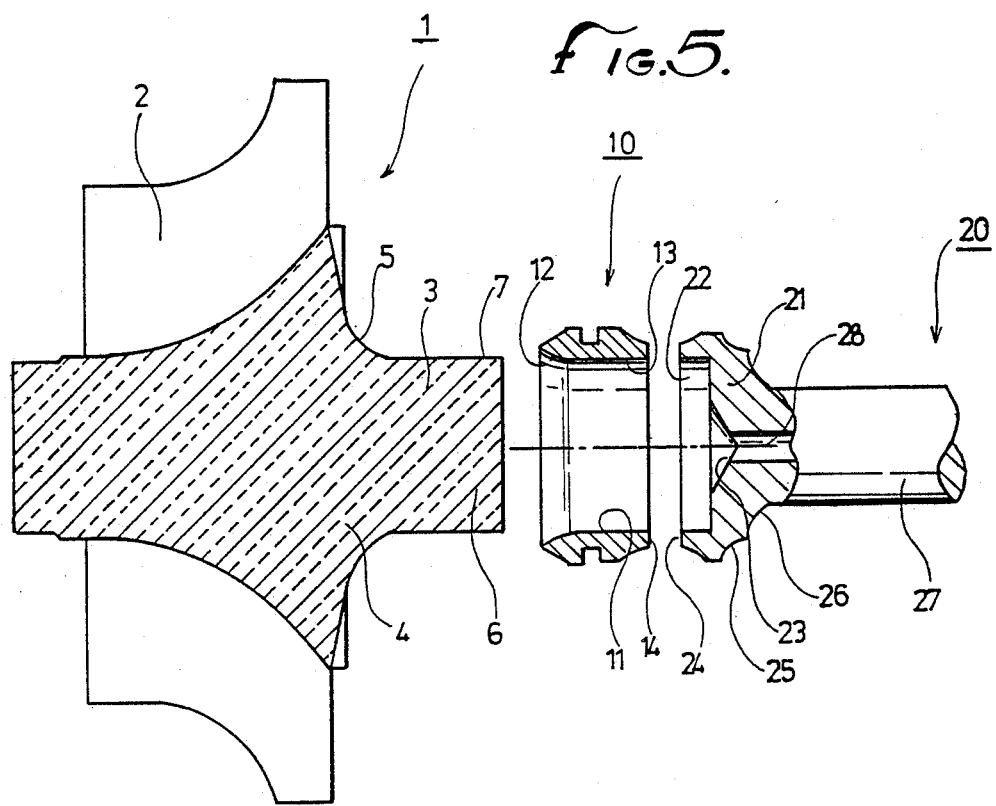
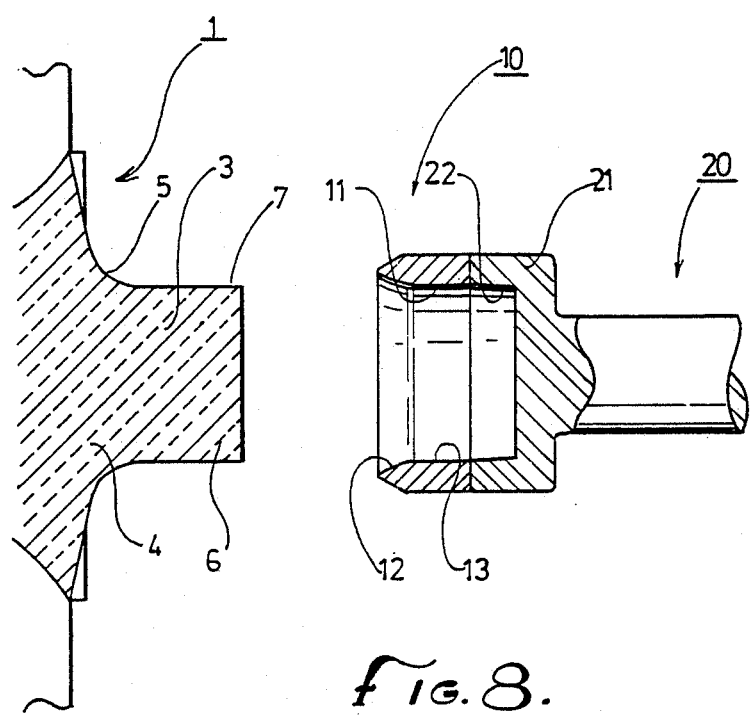

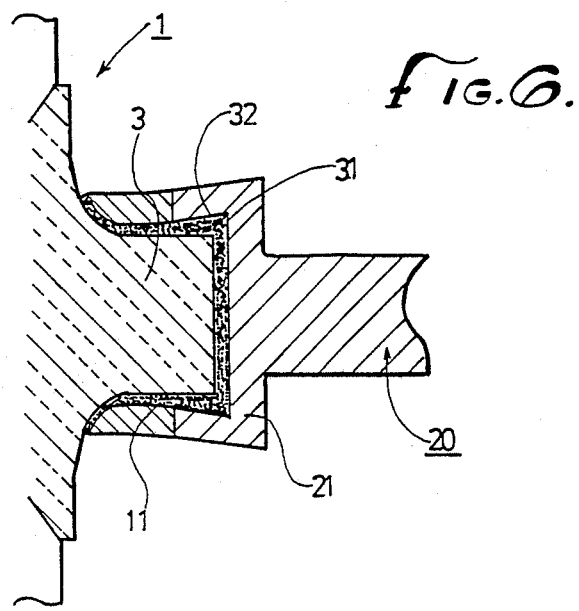
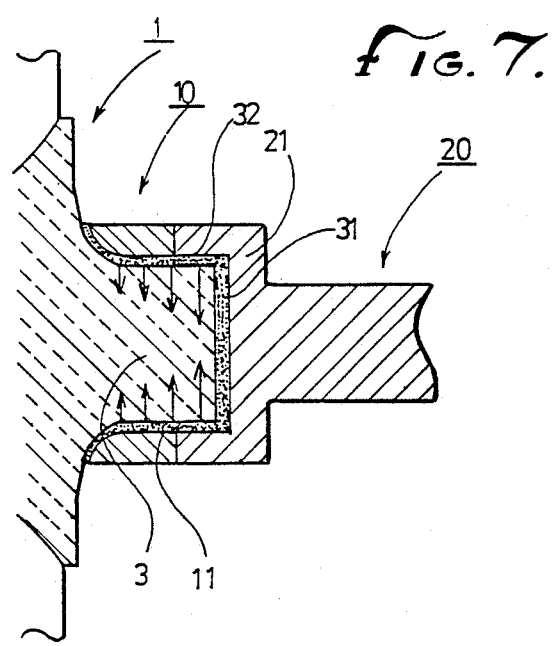

METAL-CERAMIC FITTING ASSEMBLY

BACKGROUND OF THE INVENTION

The general field of the present invention is interconnection of ceramic members to metallic members.

Currently ceramics are increasingly being used in place of metals in mechanical environments where heat resistance and/or low specific gravities are important. For example, ceramic turbine disks are replacing metal disks in the turbo-superchargers of internal combustion engines. The turbo-supercharger is a unit for pre-compressing intake air or air/fuel mixture. The supercharger makes use of the pressure generated by exhaust gases to turn an exhaust turbine disk which drives a compressor. Since the turbine disk is a member which is exposed to hot exhaust gases and which rotates at high speeds, it is more efficient to make the disk of ceramics which have higher heat resistance and lower specific gravities than metals. Moreover, certain ceramics are as strong as metals.

On the other hand, metals are still used for certain purposes and therefore a means of joining the ceramic parts to the metal parts must be found. The problem is the thermal expansion coefficients of the metals used tend to be two to five times higher than those of ceramics. For example, Cr-Mo steel has a coefficient of thermal expansion of $E=11.7\times10^{-6}/°C$. whereas the ceramic, silicon nitride ($Si_3N_4$), has a coefficient of thermal expansion of $E=2.6$ to $4.5\times10^{-6}/°C$. In high temperature environments, metal parts thus have a tendency to expand more rapidly than the ceramic parts, often causing the metal to pull away from or break the ceramic.

Various means for joining ceramics to metals have been proposed. Examples are described in Japanese Patent Application Laid-Open No. 103902/1984 and Japanese Utility Model Application Laid-Open No. 5701/1984, the disclosures of which are incorporated herein by reference and are briefly discussed in the Detailed Descriptions of the Drawings of this invention. In the above disclosures, a boss portion of a ceramic disk extends into a cup-shaped end of a metal shaft. The boss portion is joined by a shrink-fit connection or by brazing to the sleeves of the cup-shaped end which sleeves are made of metal with a thermal expansion coefficient that is substatially the same as that of the ceramic. Since the ceramic boss and the metallic sleeve expand at a nearly equal rate, normally the connection between the boss and the sleeve is not broken at high temperatures. However, other cracks and failures can occur in these prior art arrangements.

SUMMARY OF THE INVENTION

The present invention relates to composite ceramic metal assemblies some of which may have solder in contact with the ceramic and the metal member for adhesion, at least some of the metal having a substantially higher coefficient of thermal expansion than the ceramic. According to one aspect of the invention the boss portion of a ceramic disk is insertedinto a cup-shaped end of a metallic shaft and is heated to a temperature much higher than the melting point of the solder. Liquid solder thereby penetrates between the ceramic boss and the metallic cup-shaped end while the temperature remains high. The entire assembly is then allowed to cool. Because the thermal expansion coefficient of the metallic cup-shaped end is much higher than that of the ceramic boss, the space between the cup-shaped end and the boss is greater than it would be were the solder injected when the assembly was cool. Therefore, there is more solder in the space at the higher temperature and as the assembly cools the metallic end contracts against the solidified solder thus gripping the ceramic boss.

According to another aspect of the invention the connection between the cup-shaped end of the member and the ceramic boss can be effected without solder by providing the interior surface of the cup-shaped end with an inwardly converging taper such that when the metal-member is shrunk fit onto the boss an effective gripping action occurs.

Accordingly, the present invention has the advantage of using a metal of a higher coefficient of thermal expansion than a ceramic to grip the ceramic. Other and further advantages will appear hereinafter.

BRIEF DESCRIPTION OF THE DRAWINGS

FIG. 3 is a sectional side view showing one embodiment of the present invention.

FIG. 4 is a top view of a ceramic disk taken along line IV—IV of FIG. 3.

FIG. 5 is an exploded assembly sectional side view of the fitting assembly of FIG. 3.

FIG. 6 is a schematic sectional side view of a part of the fitting assembly of FIG. 3 illustrating the heating and expanded state during the soldering operation.

FIG. 7 is a schematic sectional side view of a part of the fitting assembly of FIG. 3 illustrating the cooled and shrunken state after the soldering operation.

FIG. 8 is a sectional side view showing essential portions of an alternate embodiment of the present invention.

DETAILED DESCRIPTION OF THE DRAWINGS

Figure 1:
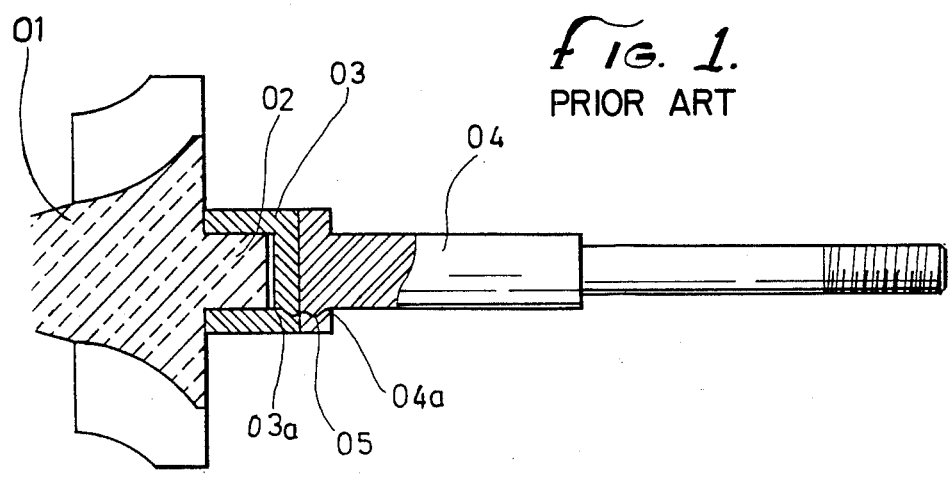
FIG. 1 is a sectional side view showing the prior art fitting assembly of Japanese Utility Model Application Laid-Open No. Utility Model 5701/1984.

In the disclosure of the Japanese Utility Model Application Laid-Open No. 5701/1984, as shown in FIG. 1, there is connected to a boss 02 of a ceramic disk 01 by the shrinking or brazing method a sleeve 03, which is made of a metal having a coefficient of thermal expansion that is substantially the same as that of the ceramic. The sleeve 03 is welded to a metallic shaft 04. As a result, stress occurs at the welded portion of the sleeve 03 and the shaft 04 because the coefficient of thermal expansion of the shaft 04 is much higher than that of the sleeve 03. The stress tends to be concentrated in the bottom corner 03a of the sleeve 03 and in the corner 04a of the shaft 04. This makes cracks apt to occur along a line, indicated as 05, joining the two corners 03a and 04a. If a large shrinking allowance is made when the sleeve 03 is shrunk onto the boss 02, the boss 02 tends to rupture because of the high stress generated at the root thereof. If the shrinking allowance is small, the adhesion force acting upon the contact portion between the boss 02 and the sleeve 03 is uniformly distributed so that the boss 02 tends to come out of the sleeve 03.

Figure 2:
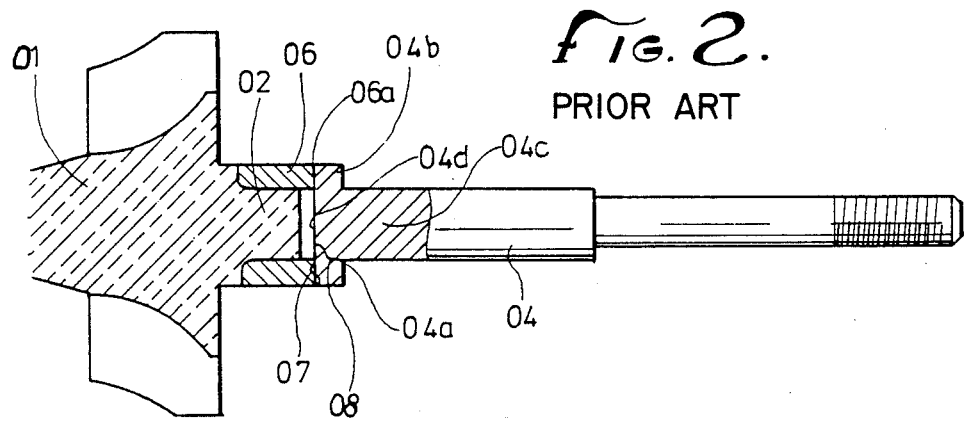
FIG. 2 is a sectional side view showing the prior art fitting assembly of Japanese Patent Application Laid-Open No. 103902/1984.

In the disclosure of Japanese Patent Application Laid-Open No. 103902/1984, as shown in FIG. 2 and wherein like numerals are employed to designate elements corresponding to those shown in FIG. 1, there is fitted on the circumference of the boss 02 of the ceramic disk 01 a cylindrical sleeve 06, which has a coefficient of thermal expansion approximately equal to that of the ceramic disk 01, and has its end face 06a fixed to the metallic shaft 04 by welding. In the device, a crack 07 is liable to be formed along the joined faces of the cylindrical sleeve 06 and the metallic shaft 04 in their thermally loaded state as a result of the difference between the coefficients of thermal expansion of the sleeve 06 and the shaft 04. Also, the shaft-end cylindrical portion 04b of the metallic shaft 04, which is adjacent to the end face 06a of the cylindrical sleeve 06, is affected by the aforementioned difference in the coefficients of thermal expansion. Because the sleeve 06 and the end portion 04b are welded together, the end portion 04b tends to resist the thermal expansion of the shaft portion 04c of the metallic shaft 04 so that a crack 08 is liable to be made along the line joining the metallic shaft end face 04d and the metallic shaft corner 04a. Moreover, the same shrinkage problems that were discussed in the foregoing paragraph with regard to the FIG. 1 device occur in this device thus tending to cause the boss 02 to either rupture or come out of the sleeve 06. Further, it should be noted that the end face of the boss 02 is not secured to the metal member in either embodiment of the prior art, FIGS. 1 and 2, but rather is spaced from the facing end of the metal member to be gripped only by the inner surface of the extending sleeve.

The present invention will now be described with reference to the first embodiment shown in FIGS. 3 to 7 as applied to a turbo-supercharger attached to an automotive internal combustion engine. The turbo-supercharger is a unit for compressing intake air or air/fuel mixture. The supercharger uses the pressure generated by exhaust gases to turn an exhaust turbine disk which drives a compressor by a connecting metal shaft.

As illustrated in FIGS. 3 and 4, a turbo-supercharger rotor is constructed of a composite assembly including a turbine disk 1 made of, for example, silicon nitride ceramics, a sleeve 10 made of a metal alloy (for example, 23 to 30 wt. % of Ni, 17 to 30 wt. % of Co, 0.6 to 0.8 wt. % of Mn and the remainder of Fe) having a coefficient of thermal expansion substantially equal to that of the silicon nitride ceramics, a rotary shaft 20 made of Cr-Mo steel, and a compressor drum (not shown) assembled integrally with the rotary shaft 20. The compressor drum (not shown) is fitted on the smaller-diameter portion 29 of the rotary shaft 20 and is assembled integrally with the same by means of a nut (not shown) which is fastened on a male thread 30 on the shaft 20.

Turning to FIG. 5, the sleeve 10 has its inner circumference sized and shaped to be fitted with a slight but generally constant gap on a boss 3 formed on the turbine disk 1. This gap extends from the boss-root circumference 5 to the boss-end circumference 7. The rotary shaft 20 has an end portion 21 formed with a larger diameter than that of its central portion 27. The end portion 21 is provided with a cylindrical recess 22 that has an inner surface whose diameter is substantially the same as the inner diameter 11 of the sleeve 10 which provides a slight but substantially constant gap between it and the boss end portion 6 of the aforementioned turbine disk 1. Communication between the end so-formed cup-shaped portion 21 and the central portion 27 of the shaft 20 is provided through a communication hole 28 which extends between the bottom 23 of the cylindrical recess 22 and the outer circumference of the central portion 27 as shown in FIG. 3.

Turning now to a description of the steps in the assembly process as shown in FIGS. 5, 6 and 7. The ceramic turbine disk 1, the sleeve 10 and the rotary shaft 20, can be assembled together in the following order. The end face 14 of the sleeve 10 and the leading end face 24 of the end portion 21 of the rotary shaft 20 are integrally joined by, for example, a frictional welding operation to extend the effective length of the cup-shaped end of the shaft. The recess bottom 23 and the communication hole 28 of the rotary shaft 20 are then filled with a soldering material 31, and the boss 3 of the ceramic turbine disk 1 is positioned within the inner circumference 11 of the sleeve 10 and in the cylindrical recess 22 of the rotary shaft 20. In this state, the assembled members are heated together to a temperature higher than the melting temperature (for example, 700° C.) of the soldering material 31. Since the metal material of the rotary shaft 20 has a coefficient of thermal expansion larger than the materials of the ceramic turbine disk 1 and the sleeve 10, their unequal expansion causes the diameter between the inner circumference 11 of the sleeve 10 and the circumference of the cylindrical recess 22 of the rotary shaft 20 to increase gradually in the direction of the recess bottom 23 (as shown in FIG. 6). The gap 32 which is thus formed is filled with the molten soldering material 31 without any clearance.

When the temperature of the assembly of the ceramic turbine disk 1, the sleeve 10 and the rotary shaft 20 is gradually dropped to a level lower than the melting temperature (at about 700° C.) of the soldering material 31, the soldering material starts to solidify before the gap 32 is restored to its normal state at room temperature (as shown in FIG. 7). When the temperature of the assembly reaches room temperature, the rotary shaft 20 shrinks more than the ceramic turbine disk 1 and the sleeve 10 since the rotary shaft has the largest coefficient of thermal expansion. The thicker portion of the soldering material 31 present at the inner end of the assembled sleeve 10 and recess portion 22 resists the shrinkage of the recess portion so that the boss 3 of the silicon nitride ceramic turbine disk 1 is subjected (as shown by the arrows in FIG. 7) to a fastening force which increases gradually from its root 4 to its leading end 6.

Accordingly boss 3 of the ceramic turbine disk 1 is grasped not only by the sleeve 10 that is bonded to the end portion 21 of the rotary shaft 20 but also by the cylindrical base portion or recess 22 of the rotary shaft 20, and the securing force is increased gradually along the axial length of the boss. The solder covers the entire boss 3, both on the cylindrical surface and on the flat end. All of this makes it possible to prevent the ceramic turbine disk 1 from becoming disconnected from the steel rotary shaft 20. Moreover, on the boss 3 of the ceramic turbine disk 1, the fastening force increases gradually from the boss-root 4 close to the disk body 2 toward the boss end 6 so that no strong stress is generated in the boss root circumference 5 to prevent the boss 3 from fracturing and separating from the disk body 2.

Moreover, since the boss root circumference 5 is gently curved, as shown to have a large radius of curvature, the stress tends not to be concentrated in the vicinity of the boss root circumference 5.

As illustrated in FIG. 5 the end portion 21 of the rotary shaft 20 is furthermore, preferably formed with a shaft end portions 25 and 26 that are gently curved. As a result of this configuration, the stress is uniformly distributed about the end portion 21 rather than being concentrated at a particular point so that a crack is much less likely to occur between the corner of the cylindrical recess 22 and the shaft portions 25 or 26.

In the embodiment shown in FIGS. 3 to 7, the boss 3 of the ceramic turbine disk 1 is joined to both the sleeve 10 and the cylindrical recess 22 of the rotary shaft 20. Alternatively, as shown in FIG. 8, the boss 3 may be integrally joined to the sleeve 10 and the cylindrical recess 22 without the use of soldering material, that is solely or primarily by only the predesigned shrinkage. In this modification, the inner circumference 11 of the sleeve 10 and the cylindrical recess 22 of the rotary shaft 20 is slightly tapered in their room temperature state which taper converges toward the recess bottom 23, to provide the aftermentioned desired gripping force configuration on the boss 3 following heating of the shaft for inserting the boss and subsequent cooling.

Figure 9:
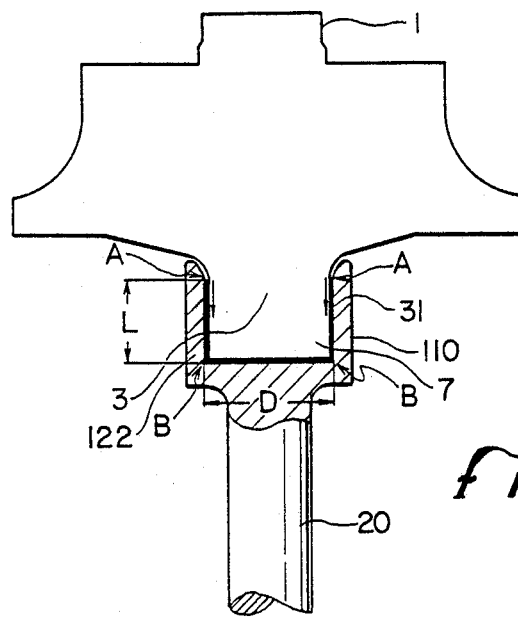
FIG. 9 is a schematic sectional side view showing the fitting relationships of the interconnected metal shaft and ceramic body of the present invention.

FIG. 9 schematically illustrates the state in which a rotary shaft 20 and a ceramic disk 1 such as disclosed with regard to FIGS. 3 to 7 are joined integrally by fitting the ceramic boss 3 of the ceramic disk 1 in the sleeve 110 of the rotary shaft 20 and by using a soldering material 31 sandwiched between their fitting and fitted faces. The ceramic boss 3 of the ceramic disk 1 is inserted into the cylindrical fitting hole of the rotary shaft 20, and these two members are heated to a temperature higher than the melting point of a soldering metal 31 so that the soldering material 31 may penetrate the gap provided between the boss and the fitting hole. After being cooled down to room temperature, the ceramic boss 3 and the rotary shaft 20 in the soldered state are subjected in the axial direction between portions A and B to an internal stress expressed by L(E1-E2)t (where E1 and E2 designate the coefficients of thermal expansion of the rotary shaft 20 and the ceramic disk 1, "t" designates the difference between the soldering temperature and the room temperature and L is the dimension indicated in FIG. 9). Because of the large shrinkage of the sleeve 110 during cooling, a compressive stress is generated in the surface layer of the ceramic boss 3 between points A and B so that a tensile stress is generated in the portion A. As a result, an excessive fitting length L will cause a rupture in the portion A of the ceramic boss 3 in combination with the bending stress which is generated in the ceramic boss 3 of the ceramic disk 1, when the two members 1 and 3 are rotated. Moreover, since the ceramic disk 1 has its total length increased, large vibrations are generated thus causing more stress in the joined portions. On the other hand, an insufficient fitting length L will result in an insufficient area of contact for the soldering of the joining faces so that the ceramic disk 1 tends to come out of the sleeve 110.

After conducting experiments, the present inventors have found that the most satisfactory result can be attained by making the fitting length L and the hole diameter D satisfy the equation $0.4 \leq L/D \leq 1.0$. In this case, the ceramic disk 1 can be used for a long term without rupturing or coming out of the metallic shaft member.

The assembly having the disk 1 and the rotary shaft 20 combined as described above was tested in eleven different relative sizes or ratios as shown by points in the graph of FIG. 10 and listed in the following Table 1, the fitting length L to the internal diameter D of the sleeve 10. These samples were rotated at high speeds on the rotary shaft 20 and examined as to whether or not troubles were caused until the target or operating r.p.m., No, was reached.

TABLE 1

| Samples | 1. D | 2. L | 3. L/D | 4. R.P.M. | 5. Remarks |
|---|---|---|---|---|---|
| 1 | 9.7 | 7.3 | 0.75 | No | No Trouble |
| 2 | 9.7 | 15.7 | 1.62 | 0.70 No | Ceramics Bent |
| 3 | 12 | 3.3 | 0.28 | 0.76 No | Ceramics Disjointed |
| 4 | 12 | 3.3 | 0.28 | 0.72 No | Ceramics Disjointed |
| 5 | 12 | 5.3 | 0.44 | No | No Trouble |
| 6 | 12 | 7.3 | 0.61 | No | No Trouble |
| 7 | 12 | 7.3 | 0.61 | No | No Trouble |
| 8 | 12 | 12.3 | 1.03 | No | No Trouble |
| 9 | 12 | 12.3 | 1.03 | 0.89 No | Ceramics Bent |
| 10 | 13 | 14.3 | 1.10 | No | No Trouble |
| 11 | 13 | 14.3 | 1.10 | 0.77 No | Ceramics Bent |

In Table 1, the third column lists the L/D values of the respective samples, the fifth column the contents of the troubles caused, and the fourth column the r.p.m. as a decimal of No in the case of problems and the target r.p.m., No, in the case of no trouble. FIG. 10 is a graph plotting the relationship between the values listed in the aforementioned third and fourth columns, i.e., the ratio L/D and the r.p.m.

Figure 10:
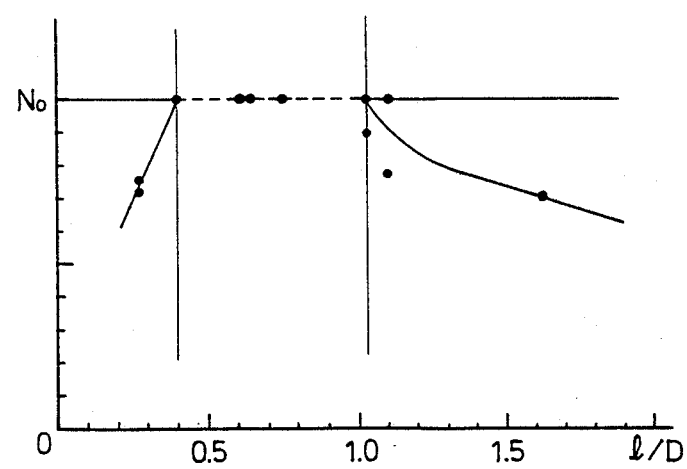
FIG. 10 is a graph depicting test results of the embodiment of FIG. 3.

For the ratio L/D ranging from 0.4 to 1.03, as is apparent from FIG. 10, no trouble arises even if the rotations of the samples reach the target r.p.m., No. Outside of the range (i.e., $L/D < 0.4$ or $L/D > 1.03$), the troubles listed in the fifth columns of the Table 1 occurred before the tested sample reach the target r.p.m., No. From this it may be seen that the proper ratio of length to diameter of the cup-shaped end produces the desired gripping of the ceramic boss 3 for optimum performance.

What is claimed is:

1. A metal-ceramic composite body including a member formed of ceramic material having a generally cylindrical boss extending from the surface of said member to a free leading end and a shaft formed of a metal material whose coefficient of thermal expansion is greater than that of said ceramic material, and means for connecting said shaft to said boss, comprising:
    a cup-shaped end on said shaft defined by a recess on said shaft receiving the leading end of said boss and a sleeve affixed to said shaft end, said sleeve having a through-opening coaxially aligned with said recess in said shaft to enclose said boss and being formed of a metal whose coefficient of thermal expansion corresponds substantially with that of said ceramic material, and bearing means interposed between facing surfaces of said connecting means and said boss for imposing a compressive force about the surface of said boss that increases in magnitude axially along said boss toward the leading end thereof upon heating said composite body and subsequent cooling thereof.

2. The metal-ceramic composite body as recited in claim 1 in which said bearing means comprises a taper formed on aligned surfaces of said sleeve and said recess, said taper converging toward the end of said recess.

3. The metal-ceramic composite body as recited in claim 1 in which said bearing means comprises a body of solder material between the exterior of said boss and the aligned surfaces of said sleeve and said recess.

4. The metal-ceramic composite body as recited in claim 3 in which the thickness of said body of solder material increases axially along said boss prior to cooling of said composite body.

5. The metal-ceramic composite body as recited in claim 4 in which said solder material is fillingly disposed between said boss and said cup-shaped end of said shaft.

6. The metal-ceramic composite body as recited in claim 5 in which the aligned surfaces of said sleeve opening and said recess define an opening receiving said boss having a length-to-diameter ratio of between about 0.4 to about 1.0.

* * * * *